United States Patent
Hsu

(10) Patent No.: US 8,385,951 B2
(45) Date of Patent: Feb. 26, 2013

(54) SMS WRAPPER/DEWRAPPER AND MOBILE DEVICES EMBEDDED WITH THE SMS WRAPPER/DEWRAPPER

(75) Inventor: Tony Hsu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 12/055,425

(22) Filed: Mar. 26, 2008

(65) Prior Publication Data

US 2008/0242326 A1 Oct. 2, 2008

(30) Foreign Application Priority Data

Mar. 30, 2007 (TW) .............................. 96111528 A

(51) Int. Cl.
*H04W 4/00* (2009.01)
(52) U.S. Cl. ................. 455/466; 455/552.1; 455/556.2; 370/401
(58) Field of Classification Search .................. 455/466, 455/552.1, 556.2; 370/401
See application file for complete search history.

(56) References Cited

U.S. PATENT DOCUMENTS

| 7,028,306 | B2 * | 4/2006 | Boloker et al. ............... 719/310 |
| 2003/0013467 | A1 * | 1/2003 | Caloud ............................ 455/466 |
| 2003/0149719 | A1 * | 8/2003 | Wang ............................. 709/202 |
| 2005/0197157 | A1 | 9/2005 | Li et al. |
| 2006/0095556 | A1 * | 5/2006 | Arnold et al. ............... 709/223 |
| 2006/0199599 | A1 * | 9/2006 | Gupta et al. .................. 455/466 |
| 2007/0067385 | A1 * | 3/2007 | D'Angelo et al. ............ 709/203 |
| 2007/0167178 | A1 * | 7/2007 | Al-Harbi ....................... 455/466 |
| 2008/0146257 | A1 * | 6/2008 | Clegg ........................... 455/466 |
| 2008/0176586 | A1 * | 7/2008 | George et al. ................ 455/466 |
| 2009/0132220 | A1 * | 5/2009 | Chakraborty et al. ......... 703/13 |
| 2009/0235072 | A1 * | 9/2009 | Kelly et al. ................... 713/168 |

FOREIGN PATENT DOCUMENTS

WO 2007104313 A1 9/2007

OTHER PUBLICATIONS

Verhoeven, R., et al., "Defining Services for Mobile Terminals Using Remote User Interfaces", IEEE Trans. on Consumer Electronics, vol. 50, No. 2, pp. 536-542, May 2004.
"Jiminy! SMS", Abiro Mobile Developer, 2004-2008.

* cited by examiner

*Primary Examiner* — Nimesh Patel
(74) *Attorney, Agent, or Firm* — Patents on Demand P.A.; Brian K. Buchheit; Scott M. Garret

(57) ABSTRACT

Disclosed is a method for providing a GUI for manipulation utilizing a SMS in PDU mode, comprising: receiving a SMS message which comprises encoded SM data; parsing said SM data for decoding to retrieve form display data; generating a UI element corresponding to said form display data; and displaying said UI element.

16 Claims, 8 Drawing Sheets

ChoiceGroup:
ChoiceGroup with *POPUP*
Log in status
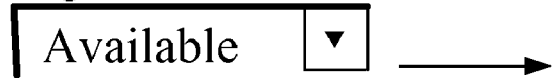
→  504
ChoiceGroup with *Multiple Display*
- ☑ Show online only
- ☑ Contact A-Z
- ☑ Groups A-Z
- ☑ Show timestamps     502
- ☐ Full screen input
ChoiceGroup with *EXCLUSIVE* Connection Options
- ⦿ Direction Connection
- ○ HTTP connection     500
FIG. 5

SMS WRAPPER/DEWRAPPER AND MOBILE DEVICES EMBEDDED WITH THE SMS WRAPPER/DEWRAPPER

CROSS-REFERENCE TO RELATED APPLICATIONS

This application claims the benefit of Taiwan Patent Application No. 96111528 filed 30 Mar. 2007, which is hereby incorporated by reference.

BACKGROUND OF THE INVENTION

The present invention generally relates to a technique for providing an interactive graphical user interface (GUI) element in a mobile device, and more particularly, to a technique for converting data received in a data message into an interactive GUI element.

With the advent of the mobile environment, communication service providers are interested in increasing their revenue by offering, for example, interactive services to subscribers. Given that mobile devices have limited computing resources, however, such services must be provided in a way that fits within the computing constraints of a mobile device. Text messaging such as that known in the industry as Short Message Service (SMS) is a popular non-voice means of communicating in the mobile environment, however, it only has text, and may be considered as the mobile version of e-mail. Similar to e-mail, SMS does not lend itself to communicating interactive content.

Moreover, some simple interactive applications are facilitated by a GUI which provides easy access and easy interaction. An example of such an application may be, for example, an opinion poll. An opinion poll usually requires users to select their choice(s) and then click an OK button or equivalent to send the user's selections back to the content provider. A simple GUI for better interaction between the users and content providers would therefore be desirable in mobile devices.

A paper published in IEEE Transactions on Consumer Electronics, V50, n2, May, 2004, P535-542, titled "Defining Services for Mobile Terminals Using Remote User Interfaces" (Author: Verhoeven, Richard, Dees, Walter), discloses a Remote User Interface (RUI) protocol. With the RUI protocol, the client application first receives a description of an initial user interface, called a UI fragment, to generate an initial interface. Subsequently, when the presented UI needs to be updated or changed, instead of sending a complete interface, only the required changes to the existing interface are sent in the form of a partial interface description, also called a UI fragment, (e.g. XML-based user interface descriptions). These subsequently received UI fragments are then used to adjust the existing interface so as to achieve better performance and better inter-operability. However, the interface provision scheme disclosed in the paper requires complicated descriptions, such as XML-based user interface descriptions, which may be overly complicated for simple interactive applications.

Today, an electronic form document is often used as a technique for providing interaction services. Currently, electronic form documents are typically rendered using a browser and Java Script technology. However, Java Script code is too large to be used in most mobile devices. JavaME, which specifies a mobile-based alternative to Java Script, is a popular platform on mobile devices. Therefore, there is an opportunity to provide a communication service that allows simple interaction by leveraging JavaME and SMS to provide electronic form document technology on such devices, and other device with limited resources.

BRIEF SUMMARY OF THE INVENTION

The present invention provides a simple GUI on mobile devices to render an electronic form document utilizing SMS messaging for the users to conveniently input data, thereby providing a simple interactive application (service) to users.

The present invention may be implemented as a method for providing a GUI for manipulation utilizing via SMS in protocol description unit (PDU) mode, commencing by receiving a SMS message which comprises specially encoded SM (short-message) data; parsing the SM data for decoding to retrieve electronic form document display data; generating a UI element corresponding to the electronic form document display data; and displaying the UI element.

BRIEF DESCRIPTION OF THE SEVERAL VIEWS OF THE DRAWINGS

In order to further understand of the invention and advantages thereof, the following detailed description of the disclosed embodiment will be considered in conjunction with the accompanying drawings, in which:

FIG. 5 illustrates some examples of rendered GUI electronic form documents, in accordance with an embodiment of the invention;

DETAILED DESCRIPTION OF THE INVENTION

Figure 1:
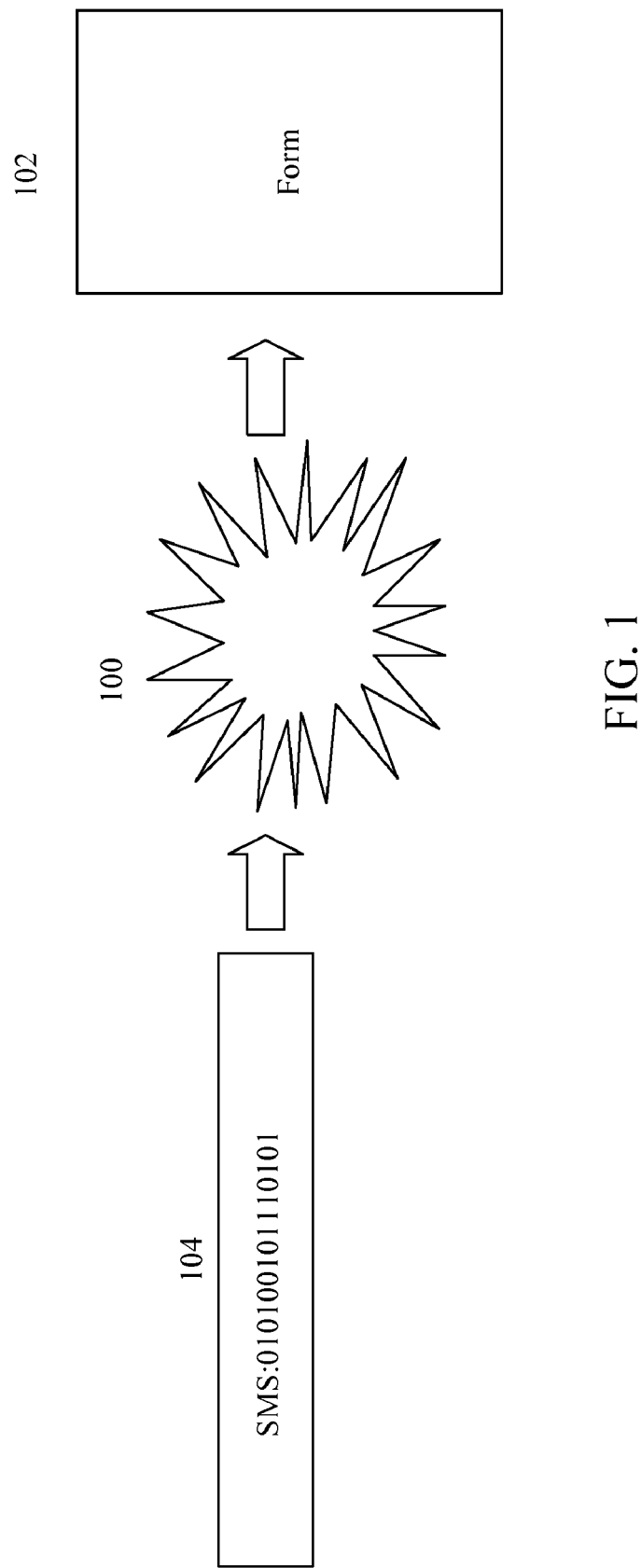
FIG. 1 depicts a process of converting an SMS message into a renderable interactive electronic form document, in accordance with an embodiment of the invention.

The following terms will be used in the detailed description:

JavaME (Java platform, Micro Edition): JavaME is one of three JAVA platforms (JavaEE, JavaSE & JavaME) developed by Sun Microsystems in the United States. JavaME is an application environment that specifically addresses the needs of embedded systems or handheld systems including mobile phones, pagers, PDAs, set-top boxes and other consumer appliances. JavaME is further divided into configurations, profiles, and option packages for hardware features of different devices. Configurations are used to classify consumer electrical products according to features such as network connectivity, processor speed, memory capacity, and other features of such products. Configurations define a basic core set of class libraries available for a range of devices. Currently, there are two JavaME configurations well defined: CDC (Connected Device Configuration), and CLDC (Connected Limited Device Configuration). JavaME uses profiles to classify features of each different device in more detail. The profiles define another set of additional class libraries over configurations.

JavaME defines MIDP (Mobile Information Device Profile) which defines a class suitable for mobile devices. More detailed information can be found in websites of Sun Microsystems as follows:

http://java.sun.com/Javame/technologies/index.jsp
      http://java.sun.com/products/midp
      http://java.sun.com/products/cldc MIDP (Mobile Information Device Profile): a profile of JavaME for mobile devices, such as cell phones. Regarding the detailed description of MIDP 2.0, please refer to ISR 118 (http://jcp.org/en/jsr/detail?id=118).

Midlet: Midlet is a Java program written for MIDP standard.

Wireless Message API: The WMA provides a common interface to enable an application based on the MIDP to send and receive short text and binary messages (e.g. SMS message), as well as multimedia messages (e.g. MMS). Originally introduced in the JSR 120, WMA 1.1 has been enhanced and released as WMA 2.0 in JSR 205.

The following will describe the embodiment of the present invention. The disclosed embodiment is only for illustration, thus it will be understood by those skilled in the art that there are many modifications and changes made therein without departing from the spirit and scope of the invention. Throughout the appended drawings, similar features are identified by similar reference numerals.

FIG. 1 depicts a process of converting an SMS message into a renderable interactive electronic form document, in accordance with an embodiment of the invention. The electronic form document 102 is constructed by a wrapper/de-wrapper function 100 according to encoded SM data of a SMS message 104. As used herein the term electronic form document is meant to refer to a data structure which, when appropriately rendered, provides an interactive GUI element into which a user may enter or select information which is to be returned to the sender of the SMS message or a suitable third party. According to the invention, a SMS message 104 may be converted into an electronic form document 102 on mobile devices to provide better interaction with a user of the device. The wrapper/de-wrapper function 100 parses the SM data within the received SMS message 104, and decodes the SM data to retrieve electronic form document display data. A UI element corresponding to the electronic form document display data is then generated. Finally, the UI element is displayed on the display of the mobile device(s) receiving the SMS message.

Figure 2:
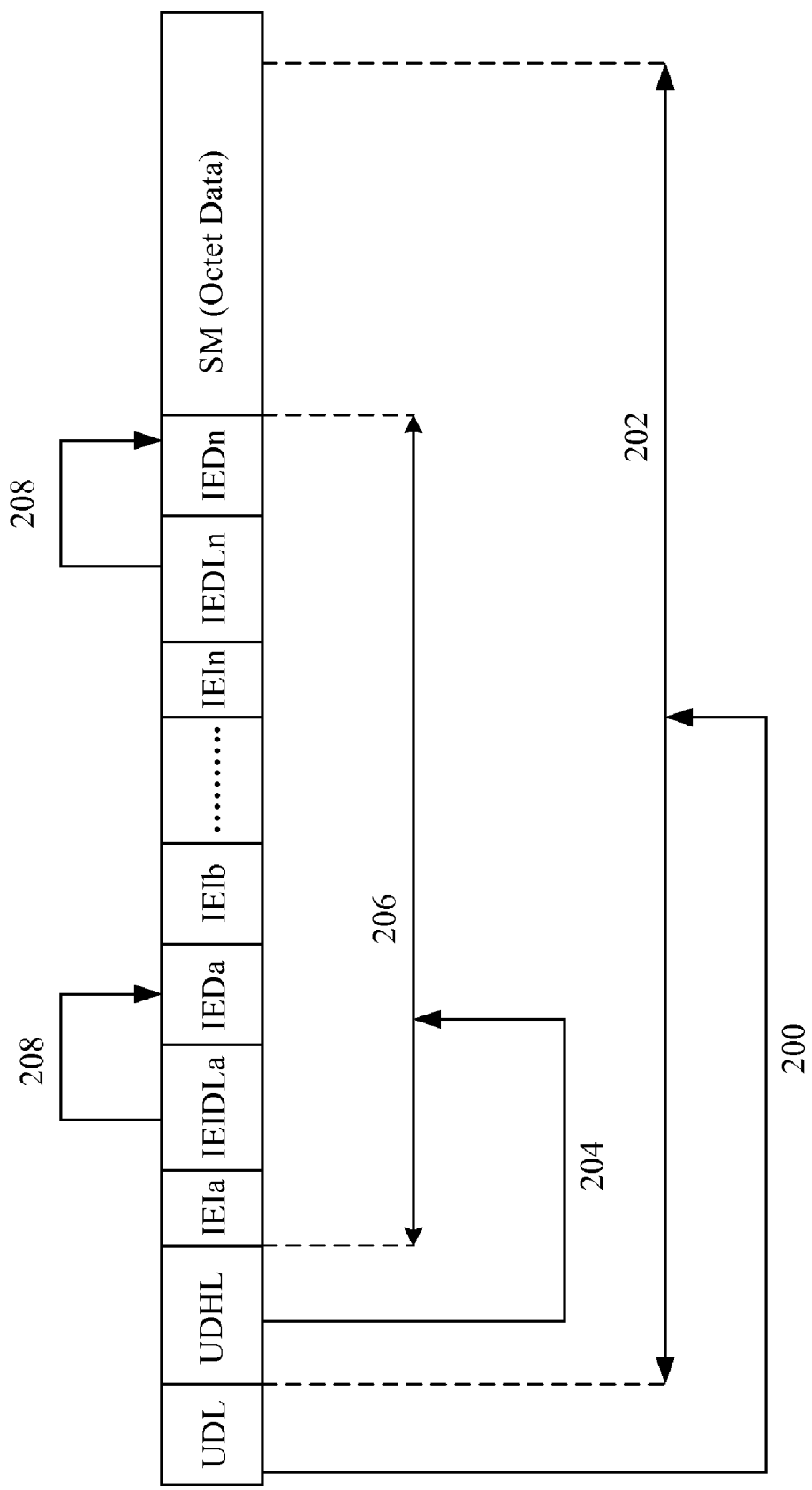
FIG. 2 shows a layout of the UDL (User Data-Length) and the UD (User-Data) data fields of a SMS message, when PDU (Protocol Description Unit) mode is used to send and receive a SMS message (prior art)

FIG. 2 shows a layout of the UDL (User Data-Length) and the UD (User-Data) data fields of a SMS message, when PDU (Protocol Description Unit) mode is used to send and receive a SMS message. The PDU mode is an open encoding mode, where any encoding may be used, as opposed to text mode where only certain preset encoding formats are allowed. The PDU string contains not only the message, but also meta-information about the sender. Please refer to the GSM standards (GSM 03.40 Version 7.4.0 Release 1998) in Technical Specification, ETSI TS 100901 V7.4.0 (1999-12), published by ETSI (European Telecommunications Standards Institute) for the detailed information. A further discussion of the PDU format may be found at: http://www.dreamfabric.com/sms. When the PDU mode is used to send and receive a message, the sender may select and indicate any suitable encoding format for encoding SM data in the designating encoding type field. The PDU mode thus allows even for the use of custom encoding types.

Referring back to FIG. 2, the UDL 200 is a length indicator. The value of the UDL 200 field is the total number of octets of the UD (User-Data) 202 following the UDL 200 field. The UDHL (User-Data-Header-Length) 204 field is the first octet of the UD content of the SMS message. The value of UDHL 204 field represents the total number of octets of IEI (Information -Element-Identifier) fields, IEIDL (Information-Element-Identifier-Data- Length) 208 fields, and IED (Information-Element-Data) fields following the UDHL 204 field. The value of each IEIDL 208 field is the number of octets of the IED following the respective IEIDL 208 field. The last field of the SMS message contains the real user data thereof, that is, the SM data in the form of octets.

As mentioned above, in PDU mode, any encoding can be used for SM data. One preferred embodiment according to the present invention utilizes the existing Liquid Crystal Display User Interface (LCDUI) classes provided in the JSR 118 MIDP 2.0 specification for JavaME to generate the desired UI displayable elements, referred to as widgets. The LCDUI is a display class API which facilitates the construction of UI elements by specifying UI parameters which may be used to create a UI element. More information regarding JSR 118 MIDP 2.0, may be found at the URL address, http://jcp.org/en/jsr/defaul?id=118.

Although, using the present example with the 4 LCDUI classes of ChoiceGroup, DateField, StringItem, and TextField those skilled in the art will appreciate that the present invention is not limited to the embodiment disclosed herein of those LCDUI classes defined by JavaME to generate UI elements. Any other API classes for GUI capable of generating displayable UI elements according to electronic form document display data of different items representing different widgets in encoded SM data can be adopted.

Figure 3:
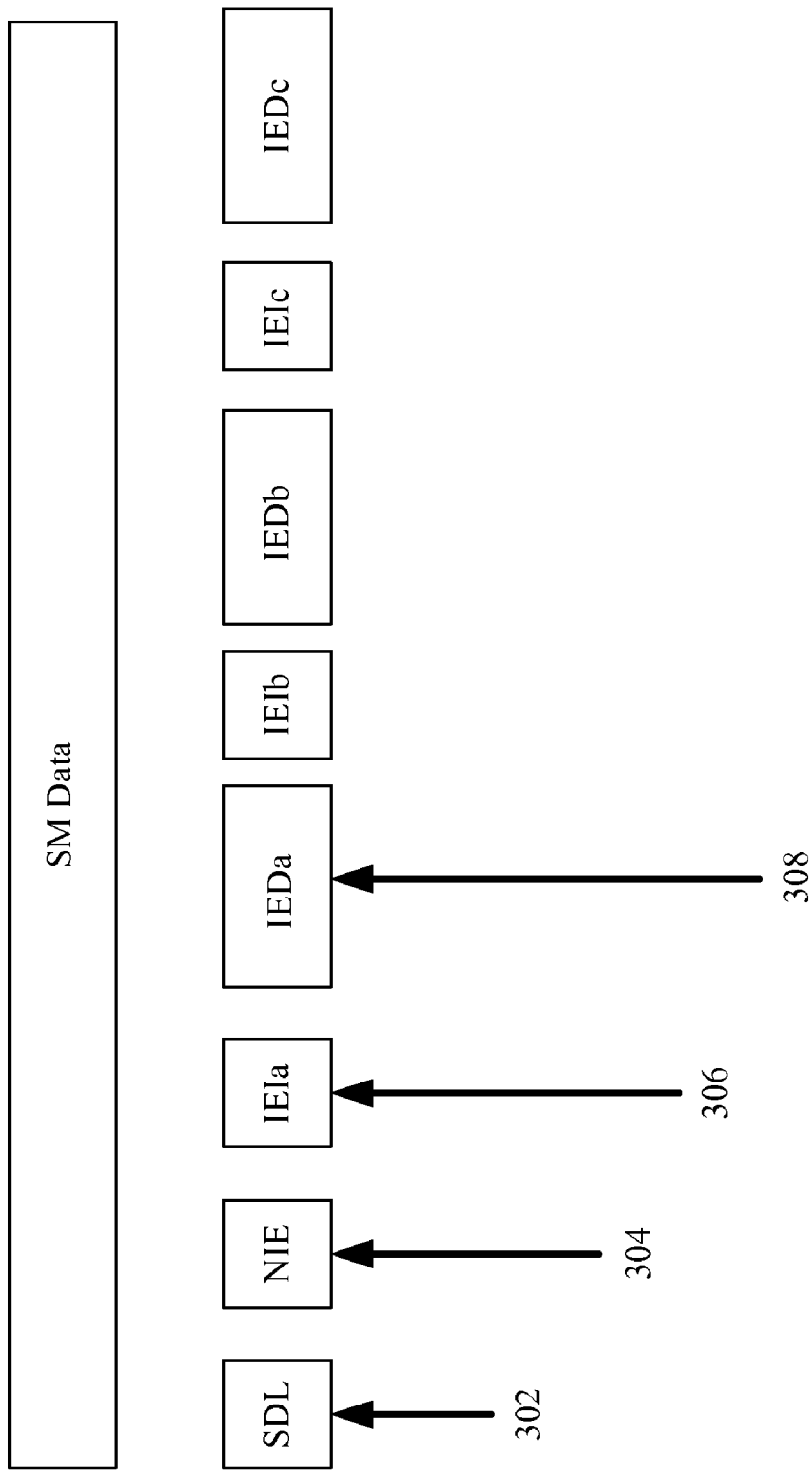
FIG. 3 depicts a format of the SM data in an SMS message for rendering an interactive electronic form document, in accordance with an embodiment of the invention.

Referring now to FIG. 3, there is shown a format of the SM data in an SMS message for rendering an interactive electronic form document, in accordance with an embodiment of the invention. The SM data includes a SDL (SM Data Length) 302 field, NIE (Number of Item Element) 304 field, IEI (Item Element Identifier) 306 fields, and IED (Item Element Data) 308 fields in order. According to one embodiment of the invention using the LCDUI classes, there are 4 types of UI classes, ChoiceGroup, DateField, StringItem, and TextField. These four classes may be called, respectively, as follows:

javax.microedition.lcdui.ChoiceGroup (String label, int ChoiceType, String [ ] string Elements, null);
javax.microedition.lcdui.DateField (String label, int mode, java.util.TimeZone timezone);
javax.microedition.lcdui.StringItem (String label, String text, int appearance Mode);
javax.microedition.lcdui.TextField (String label, String Text, int maxSize, int constraints)

Each item element identifier (IEI) 306 is in the form of octets, wherein bits 4-7 indicate a type of item, while bits 0-3 define specific types for the item. An example of encoding of bits 4-7 for item is as follows:

| Type of Item | Bits 4-7 of IEI |
| --- | --- |
| ChoiceGroup | 0000 |
| DateField | 0001 |
| StringItem | 0010 |
| TextField | 0011 |

FIGS. 4A-4D depict various formats of the item element data (IED) field of an SMS message, in accordance with an embodiment of the invention.

Figure 4A:
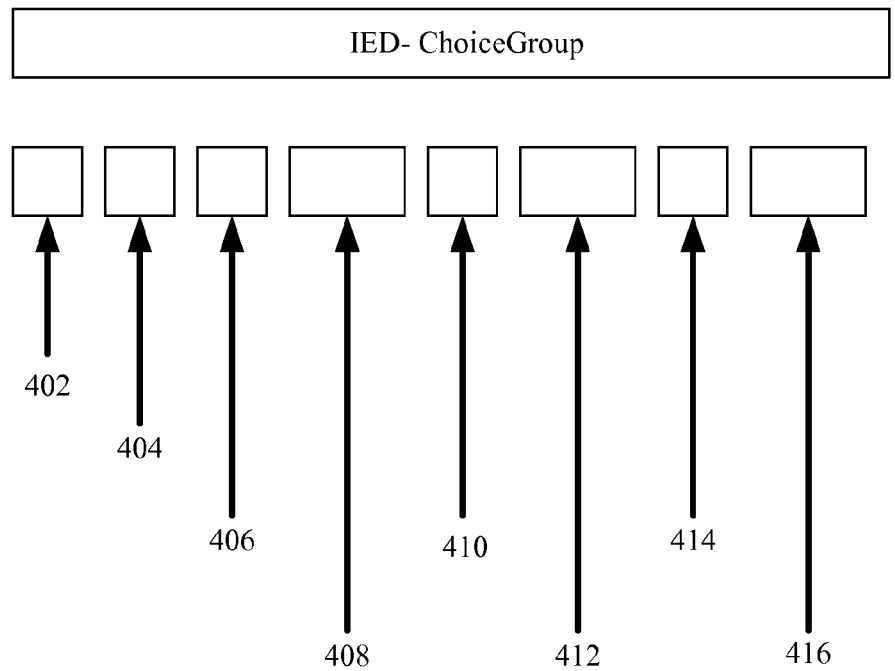
FIGS. 4A-4D depicts various formats of the item element data (IED) field of an SMS message, in accordance with an embodiment of the invention.

FIG. 4A depicts a IED format of item ChoiceGroup, wherein the bits 0-3 of IEI for ChoiceGroup are encoded to further define the types of ChoiceGroup as follows:

| Type of ChoiceGroup | Bits 0-3 of IEI |
|---|---|
| Exclusive | 0000 |
| Multiple | 0001 |
| Popup | 0010 |

The IED format of ChoiceGroup includes a Length of IED field 402, a Number of String Elements field 404, a Length of Label field 406, a Label field 408, a Length of String Element 1 field 410, a String Element 1 field 412, a Length of String Element 2 field 414, and a String Element 2 field 416 in order. The number of string elements can be more than 2 as disclosed here, if not over the allowed range of the length of a SMS message.

An example of item ChoiceGroup in accordance with the invention is introduced here. The Exclusive type for ChoiceGroup is indicated by IEI=0000,0000. As an example, if the IED data is as follows:

55 03 18 Connection Options 17 Direct Connection 15 HTTP Connection

The octet sequence consists of 8 fields corresponding to FIG. 4A: The value of the first field, 55, of the IED data represents that the length of the IED is 55 octets. The value of the second field, 03, represents that there are 3 string elements. The 3 string elements following the second field are, respectively, one label string (Connection Options), and two string elements as optional items (Direct Connection and HTTP Connection), of which the lengths are, respectively 18, 17, and 15. An Exclusive type ChoiceGroup UI element will be generated via the LCDUI and displayed on the display screen on a mobile device as a widget for a user's input, as shown in FIG. 5, reference numeral 500. FIG. 5 also illustrates examples of Multiple type 502 and Popup type 504.

Figure 4B:
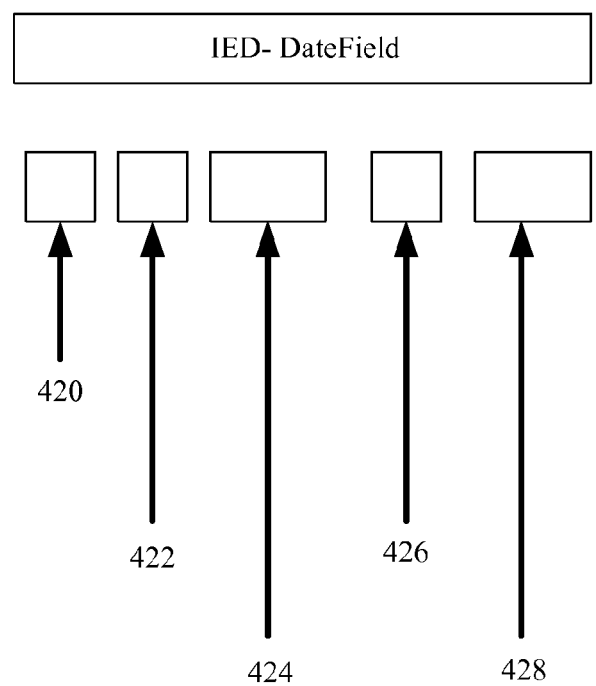

FIG. 4B depicts a IED format of DateField. The bits 0-3 of IEI for DateField can be encoded to further define the types of DateField as follows:

| Type of DateField | Bits 0-3 of IEI | Remark |
|---|---|---|
| DATE | 0000 | Display Date |
| DATE_TIME | 0001 | Display Date & Time |
| TIME | 0010 | Display Time |

The IED format of DateField includes a Length of IED field 420, a Length of Label field 422, a Label field 424, a Length of TimeZone field 426, and a TimeZone field 428 in order.

Figure 4C:
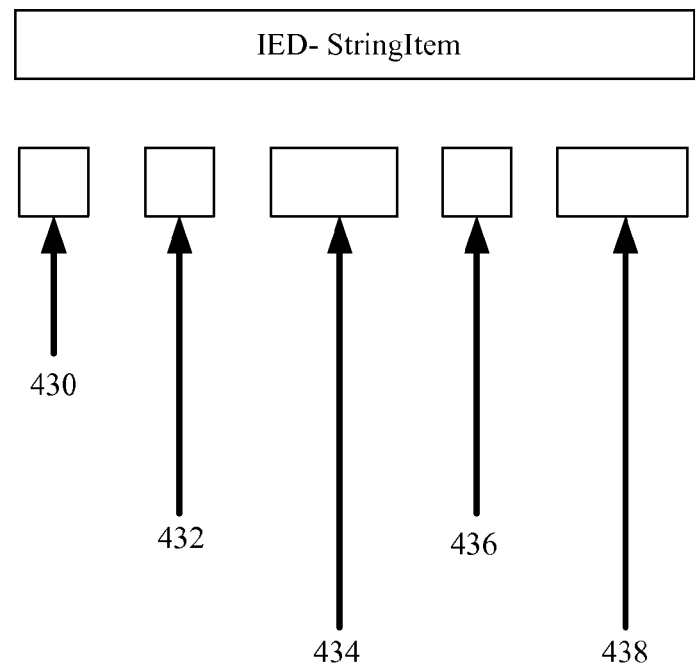

FIG. 4C depicts a IED format of StringItem. The bits 0-3 of IEI for StringItem can be encoded to further define the types of StringItem as follows:

| Type of StringItem | Bits 0-3 of IEI |
|---|---|
| PLAIN | 0000 |
| HYPERLINK | 0001 |
| BUTTON | 0010 |

The IED format of StringItem includes a Length of IED field 430, a Length of Label field 432, a Label field 434, a Length of Text field 436, and a Text field 438 in order.

Figure 4D:
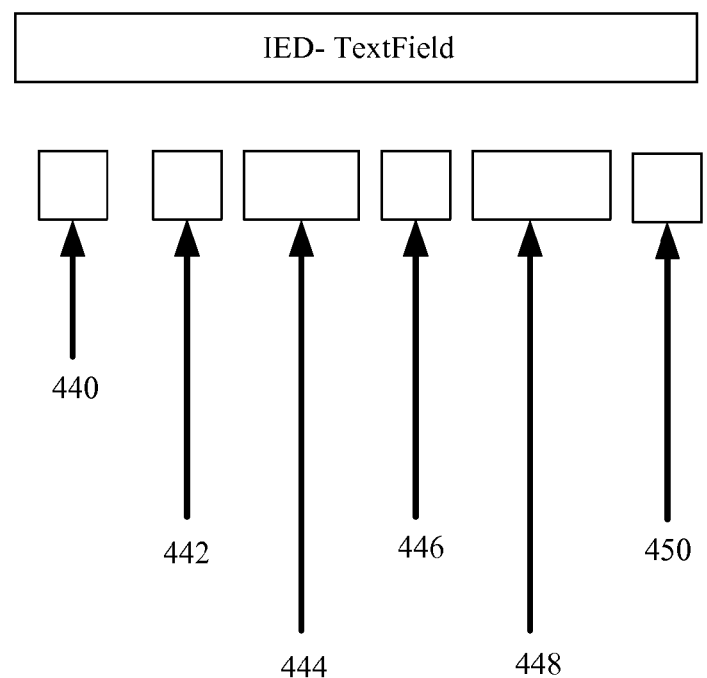

FIG. 4D depicts a IED format of TextField. The bits 0-3 of IEI for TextField can be encoded to further define the types of TextField as follows:

| Type of TextField | Bits 0-3 of IEI |
|---|---|
| ANY | 0000 |
| DECIMAL | 0001 |
| EMAIL ADDR | 0010 |
| NUMERIC | 0011 |
| PASSWORD | 0100 |
| PHONE NUMBER | 0101 |

The IED format of TextField includes a Length of IED field 440, a Length of Label field 442, a Label field 444, a Length of Text field 446, a Text field 448, and a MaxSize field 450 in order.

Figure 6:
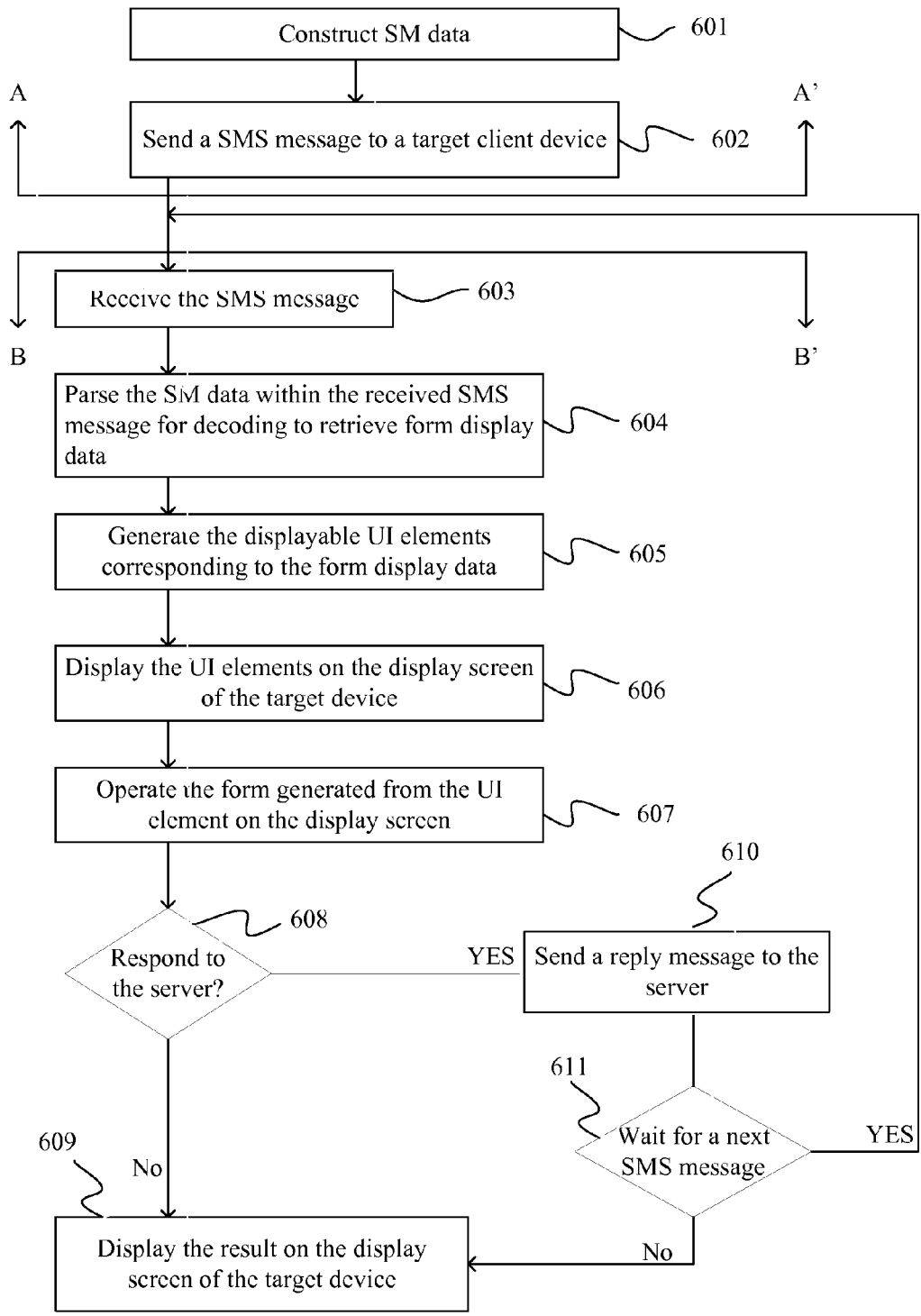
FIG. 6 depicts a flowchart diagram for a method of transmitting and rendering an interactive electronic form document via an SMS message, in accordance with an embodiment of the invention.

FIG. 6 depicts a flowchart diagram for a method of transmitting and rendering an interactive electronic form document via an SMS message, in accordance with an embodiment of the invention. Beginning at step 601, a server at a server site, represented by the A-A' portion of the flowchart, constructs SM data based on the aforementioned encoding rule of the IEI 306 and the data format of IED 308 shown in FIG. 3 & FIGS. 4A-4D. Next, a SMS message is sent to a target client mobile device at step 602. The target client device at a client site is represented in the B-B' portion of the flowchart, and receives the SMS message (Step 603). In the following step 604, the SM data within the received SMS message is parsed for decoding to retrieve the electronic form document display data. The electronic form document display data includes IEI (Item Element Identifier) 306 and IED (Item Element Data) 308. At step 605, the displayable UI elements corresponding to the electronic form document display data are generated. The present example utilizes the existing API classes of LCDUI provided in JSR 118 MIDP 2.0 for JavaME as mentioned above to generate displayable UI elements corresponding to ChoiceGroup, DateField, StringItem, and TextField according to the electronic form document display data for the different items. Finally, the UI elements are displayed on the display screen of the target device as widgets at Step 606.

Next, the user may operate the form (widget) generated from the UI element on the display screen (step 607). As the UI elements may be ChoiceGroup, StringItem (e.g. Button) or TextField etc., they all are convenient and easy for a user to respond to the received SMS message, and thus easy to interact with a server.

At step 608, a determination is made as to whether to respond to the server. If yes, a reply message is sent to the server (Step 610), and if no, the result will be displayed on the display screen of the target client device (Step 609). At step

611, a determination is made as to whether to wait for a next SMS message for further interacting with the server. If yes, go back to the Step 603 to wait for a next SMS message, otherwise go back to the Step 609 to display the result.

As JavaME is a very popular platform on current mobile devices, it is advantageous to leverage SMS technology with the JavaME technology. Thus, a discussion of the Java system environment in the context of the invention will be beneficial.

Figure 7:
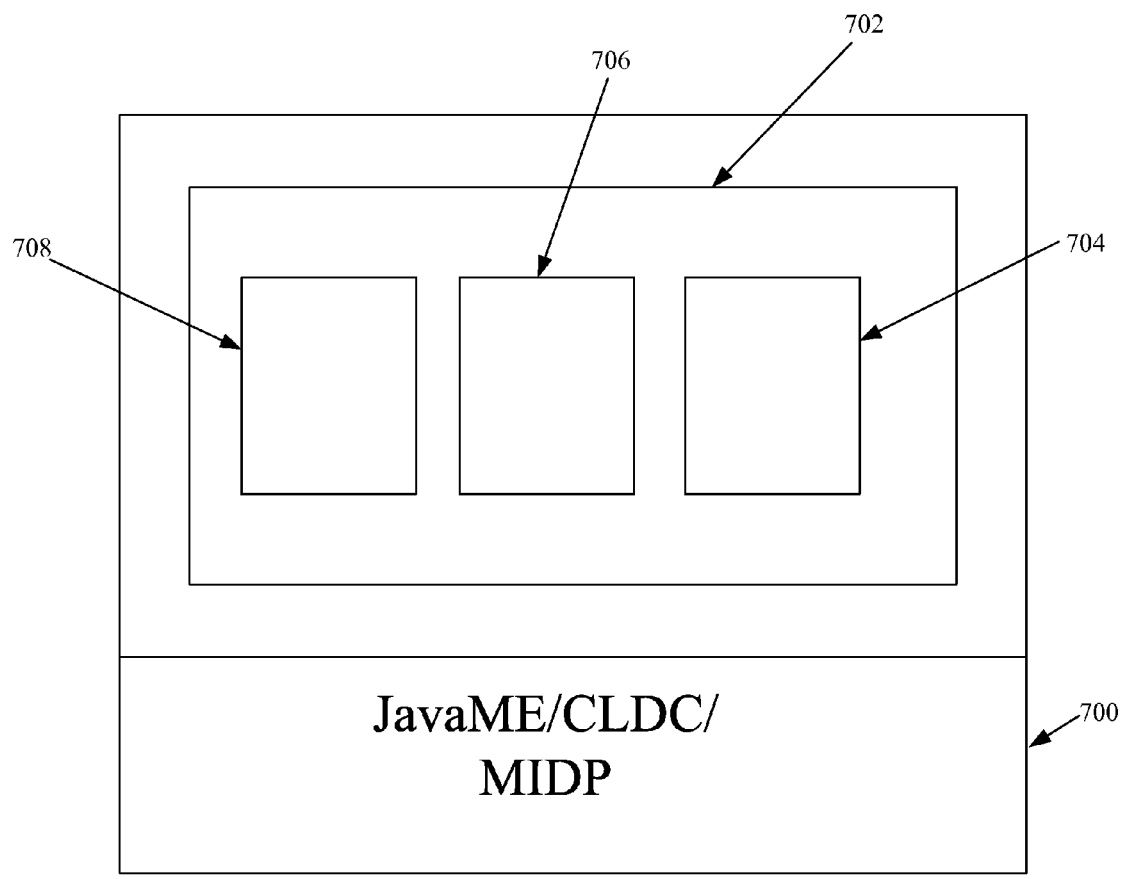
FIG. 7 illustrates a software architecture diagram of a Java system environment on a mobile device, in accordance with an embodiment of the invention.

A Java system environment of a mobile device in accordance with the present invention is illustrated in FIG. 7. A Java program (a midlet) is run on the JavaME/CLDC/MIDP platform 700. According to the present invention, a midlet 702 including a SMS wrapper/de-wrapper which performs the steps of FIG. 6 is embedded in the mobile device. The midlet 702 mainly includes a parser 704, a LCDUI 706 and a display engine 708.

The parser 704 parses the SM data within the received SMS message for decoding to retrieve electronic form document display data. The LCDUI 706, as stated above, generates displayable UI elements corresponding to the form display data. Finally, the display engine 708 displays the UI elements on the display of a target device.

In one embodiment of the invention, a SMS message can be sent/received preferably according to the JSR 120 WMA 1.1 or JSR 205, WMA 2.0 standard for JavaME, and may be referred to as a WMA message. First, the midlet 702 of a target mobile device will perform a preliminary step of calling Wireless Message API to register with a port number to receive the WMA message from the port. A service provider will send a WMA message to the target mobile device, and the midlet 702 of the mobile device will retrieve sender information (e.g. sender telephone number or web address etc.) and a server mode port number of the service provider from the WMA message. When receiving any WMA messages from the registered port, the midlet 702 of the mobile device will perform the workflow of the steps 603-606 illustrated in FIG. 6, that is, the SM data within the received WMA message is firstly parsed by the parser 704 for decoding to retrieve form display data; next, the desired UI elements corresponding to the form display data are generated by the LCDUI 706; and finally, the UI elements are displayed by the display engine 708 on the display screen of the target device as widgets. When a user operates in the widgets (e.g. click a OK button, or select a choice), the midlet 702 will send the reply result back to a sender in accordance with the sender information, and the sender will receive it from the server mode port. For example, if a sender wants to send out a choice question, then a ChoiceGroup UI of LCDUI may be desired. At this moment, receivers can just select an answer and then click OK. The answer will reply to the sender directly.

According to the embodiment of the present invention illustrated above, an interactive application can be easily accomplished. Therefore, it does not only reduce the user's (the SMS message receiver) time to key in content but also provide a better GUI to a user of a mobile device.

According to the present invention, a service provider can provide a user many simple interactive applications, such as the aforementioned opinion poll which will be explained in detail in the following. The service provider of the opinion poll firstly sends WMA messages to mobile devices. A SMS wrapper/de-wrapper midlet on the mobile devices renders the content of the messages in the form of GUI to a display screen on the mobile devices. Next, the users of the mobile devices select their choice shown on the GUI screen and click OK button, the midlet will respond the result to the service provider. Surely, the midlet can display an e-coupon information for promoting the interactive application of opinion polling.

The present invention can be applied not only to mobile devices (such as a mobile phone, a PDA or any pervasive device), but also to any other devices or systems capable of receiving/sending a SMS message.

Moreover, although the embodiment of the present invention discloses 4 items and generates 4 corresponding UI elements through LCDUI, other items can be added to generate different UI elements. The present invention is also not limited to API classes of LCDUI, any other API classes for GUI capable of generating displayable UI elements can be applied to the present invention.

The way to send a SMS message is not limited to the WMA standard. For example, a sender port and a receiver port can be defined in the header portion of the layout of a SMS message as shown in FIG. 2 for interaction, as the technical specification of GSM 03.40 mentioned above. A sender port and a receiver port can even be defined in the SM data.

The illustration of the embodiment of the present invention is given above for a better understanding of the characteristics and spirit of the present invention. It will be understood that the invention is not limited to the particular embodiment described herein, but is capable of various modifications and rearrangements without departing from the scope of the invention. Therefore, it is intended that the following claims, accompanied by detailed descriptions given the broadest explanation, not only define the scope of the present invention but also cover all such modifications and changes as fall within the true spirit and scope of the present invention.

The invention claimed is:

1. A method for providing a graphical user interface for manipulation by a user utilizing a short message service (SMS) operated in an open encoding mode, comprising:

registering with a port number to receive wireless messaging application (WMA) programming interface messages from the port;

receiving a SMS message as a WMA message via the port, the SMS message including encoded form display data;

parsing the encoded form display data;

decoding the encoded form display data to retrieve the form display data;

generating a user interface (UI) element corresponding to the form display data; and displaying the UI element.

2. The method according to claim 1, wherein the step of generating a UI element is performed by a display class application programming interface (API) of a virtual machine environment.

3. The method according to claim 2, wherein the display class API comprises ChoiceGroup, DateField, StringItem and TextField.

4. The method according to claim 1, further comprising a step of retrieving sender information of a sender and a server mode port number.

5. The method according to claim 4, further comprising a step of returning a reply message to the sender according to the information of the sender and the server mode port number.

6. A short message service (SMS) wrapper/de-wrapper for providing a GUI for manipulation utilizing a SMS in a Protocol Description Unit (PDU) mode, comprising:

means for registering with a port number to receive wireless messaging application (WMA) programming interface messages from the port;

means for receiving a SMS message as a WMA message via the port, the SMS message including encoded SM data;

means for parsing said SM data for decoding to retrieve form display data;

means for generating a user interface (UI) element corresponding to said form display data; and means for displaying said UI element.

7. The SMS wrapper/de-wrapper according to claim 6, wherein the means for generating a UI element is performed by a display class application programming interface (API) of a virtual machine environment.

8. The SMS wrapper/de-wrapper according to claim 7, wherein the display class API comprises ChoiceGroup, DateField, StringItem and TextField.

9. The SMS wrapper/de-wrapper according to claim 6, further comprising means for retrieving sender information of a sender and a server mode port number.

10. The SMS wrapper/de-wrapper according to claim 9, further comprising means for returning a reply message to the sender according to the information of the sender and the server mode port number.

11. A data processing system implemented method for providing a GUI for manipulation utilizing a short message service (SMS) in a Protocol Description Unit (PDU) mode, comprising:

registering with a port number to receive wireless messaging application (WMA) programming interface messages from the port;

receiving a SMS message as a WMA message via the port which comprises encoded SM data;

parsing said SM data for decoding to retrieve form display data;

generating a user interface (UI) element corresponding to said form display data; and displaying said UI element.

12. The method according to claim 11, wherein the step of generating a UI element is performed by a display class application programming interface (API) of a virtual machine environment.

13. The method according to claim 12, wherein the display class API comprises types ChoiceGroup, DateField, StringItem and TextField.

14. The method according to claim 11, further comprising a step of retrieving sender information of a sender and a server mode port number.

15. The method according to claim 14, further comprising a step of returning a reply message to the sender according to the information of the sender and the server mode port number.

16. A computer-readable non-transitory, storage medium, comprising program codes causing a data processing system comprising hardware to execute a method for providing a GUI for manipulation utilizing a short message service (SMS) in a Protocol Description Unit (PDU) mode, wherein the data processing system, upon executing the code, will:

registering with a port number to receive wireless messaging application (WMA) programming interface messages from the port;

receive a SMS message as a WMA message via the port which comprises encoded SM data;

parse said SM data for decoding to retrieve form display data;

generate a user interface (UI) element corresponding to said form display data; and display said UI element.

* * * * *